C. SKINNER & W. B. McCLURE.
DITCHING-MACHINE.

No. 177,758.  Patented May 23, 1876.

UNITED STATES PATENT OFFICE.

CHARLES SKINNER AND WILLIAM B. McCLURE, OF EAU CLAIRE, WISCONSIN.

IMPROVEMENT IN DITCHING-MACHINES.

Specification forming part of Letters Patent No. 177,758, dated May 23, 1876; application filed March 21, 1876.

*To all whom it may concern:*

Be it known that we, CHARLES SKINNER and WILLIAM BROWN McCLURE, of Eau Claire, in the county of Eau Claire, and State of Wisconsin, have invented a new and Improved Ditching-Machine, of which the following is a specification:

This invention consists of a kind of adjustable scoop at the forward part of the framework of a two-wheeled truck, to be drawn along for cutting the ditch, with an endless elevator at the rear of the scoop to receive the slice of earth and raise it up to a platform on which there is a kind of mold-board so arranged as to shoot the slice off obliquely upon the bank at one side of the ditch, making a simple and cheap machine to be worked by a rope and capstan.

Figure 1:
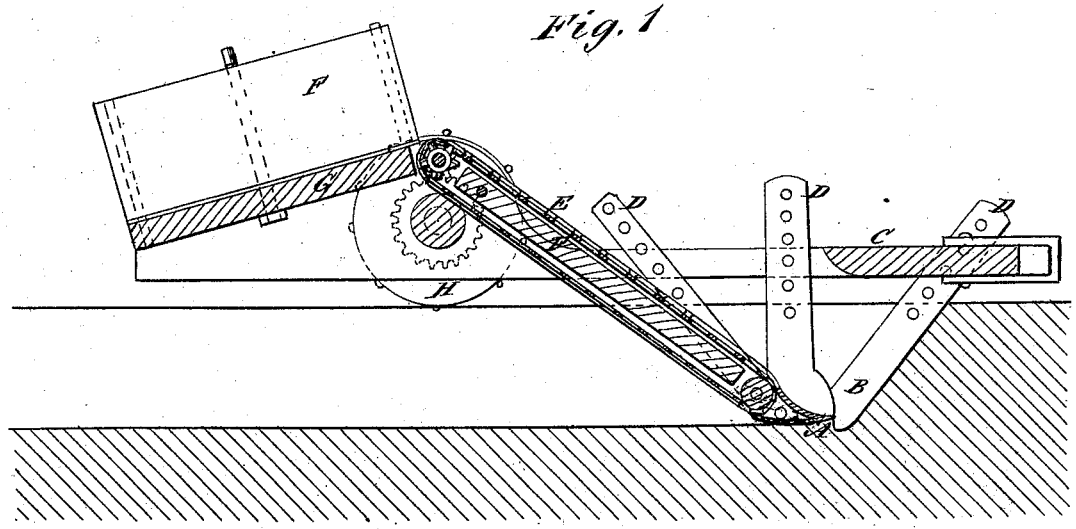
Figure 2:
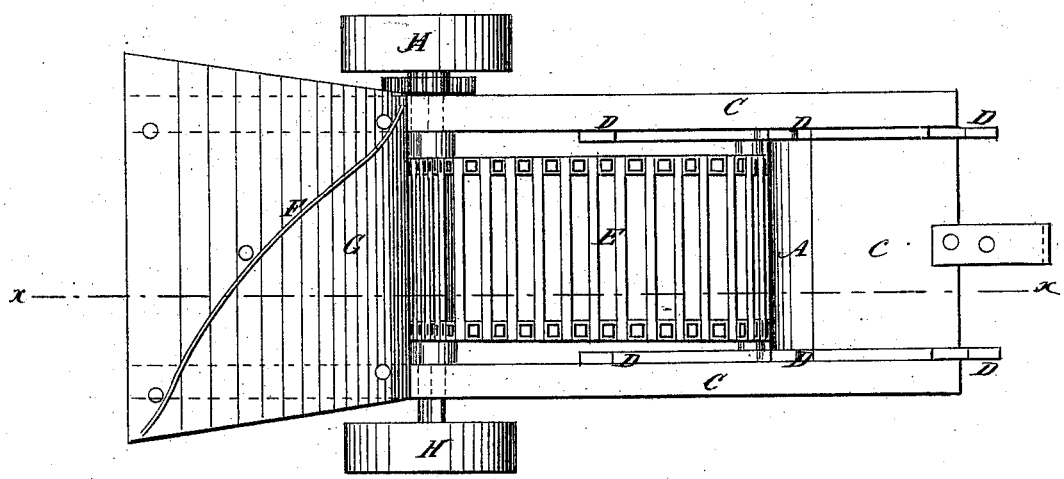

Figure 1 is a longitudinal sectional elevation of our improved machine, taken on the line $x$ $x$ of Fig. 2. Fig. 2 is a plan view.

Similar letters of reference indicate corresponding parts.

A is the bottom cutter, and B the side cutters, of a kind of scoop-shaped ditcher, which are suitably connected together and suspended from the forward part of a truck-frame or platform, C, by the bars D, which are fastened to the platform by pins, and have series of holes for the pins so that they can be shifted up and down at will. E is the endless carrier, which runs from the rear of the scoop up the incline F to the elevated platform G, whereon it discharges the slice to be thrown off on the bank at one side of the ditch by the obliquely-arranged mold-board F, said board being so arranged that it can be reversed for throwing off on either side. H represents the truck-wheels, which run on the bank each side of ditch. The slice cut out of the ditch is carried up and discharged entire with the grass side up, and is in consequence protected against being washed back into the ditch again.

Having thus described our invention, what we claim as new, and desire to secure by Letters Patent, is—

The combination, with frame having a wheel on each side, of oblique cutters B, horizontal cutter A, inclined endless carrier E, and the platform G, having side delivery, all as shown and described.

CHARLES SKINNER,
WILLIAM BROWN McCLURE.

Witnesses:
TEXAS ANGEL,
L. M. VILAS.